(12) United States Patent
Hwang et al.

(10) Patent No.: US 7,229,186 B2
(45) Date of Patent: Jun. 12, 2007

(54) PORTABLE TERMINAL HAVING CAMERAL LENS ASSEMBLY

(75) Inventors: Chang-Hwan Hwang, Goyang-si (KR); Young S. Kim, Los Altos, CA (US)

(73) Assignee: Samsung Electronics Co., Ltd. (KR)

( * ) Notice: Subject to any disclaimer, the term of this patent is extended or adjusted under 35 U.S.C. 154(b) by 103 days.

(21) Appl. No.: 11/103,145

(22) Filed: Apr. 11, 2005

(65) Prior Publication Data
US 2005/0276038 A1 Dec. 15, 2005

(30) Foreign Application Priority Data
Jun. 10, 2004 (KR) ............ 10-2004-0042448

(51) Int. Cl.
*F21V 33/00* (2006.01)
(52) U.S. Cl. ............ 362/109; 362/253; 348/375; 348/376; 455/556.1; 455/66.1
(58) Field of Classification Search ............ 362/109, 362/253; 348/333.06, 375, 376, 374; 455/575.3, 455/556.1, 66.1
See application file for complete search history.

(56) References Cited
U.S. PATENT DOCUMENTS
6,118,653 A * 9/2000 Kim ............ 361/683

| 6,587,151 | B1 * | 7/2003 | Cipolla et al. ............ 348/373 |
| 6,970,202 | B1 * | 11/2005 | Glogan et al. ............ 348/373 |
| 6,975,273 | B1 * | 12/2005 | Choi ............ 343/702 |
| 2003/0202320 | A1 * | 10/2003 | Agata et al. ............ 361/683 |
| 2004/0095500 | A1 * | 5/2004 | Sato et al. ............ 348/340 |
| 2004/0198433 | A1 * | 10/2004 | Lee ............ 455/556.1 |

* cited by examiner

*Primary Examiner*—Thomas M. Sember
(74) *Attorney, Agent, or Firm*—The Farrell Law Firm

(57) ABSTRACT

Disclosed herein is a portable terminal having a camera lens assembly includes a first housing; a second housing adapted to rotate about a hinge axis extending along a direction to unfold from a state in which it faces the first housing or to fold on the first housing; a lens housing positioned on the second housing and adapted to rotate about a rotation axis extending perpendicularly to the hinge axis; and an exposure opening formed on the outer peripheral surface of the lens housing. The portable terminal having a camera lens assembly has a pair of housings adapted to rotate about a hinge axis to fold/unfold and a lens housing adapted to rotate about a rotation axis extending perpendicularly to the hinge axis for photographing in various directions. As the lens housing is not positioned in the terminal, the terminal design can be diversified and more efficient utilization of space for mounting components can be achieved.

8 Claims, 2 Drawing Sheets

PORTABLE TERMINAL HAVING CAMERAL LENS ASSEMBLY

PRIORITY

This application claims priority to an application entitled "Portable Terminal Having Camera Lens Assembly" filed with the Korean Intellectual Property Office on Jun. 10, 2004 and assigned Serial No. 2004-42448, the contents of which are incorporated herein by reference.

BACKGROUND OF THE INVENTION

1. Field of the Invention

The present invention relates to a portable terminal, and more particularly to a portable terminal having a camera lens assembly.

2. Description of the Related Art

In general, a "portable terminal" refers to an appliance for providing wireless communication between users or between a user and a service provider via a telecommunication base station. A user can conveniently carry the portable terminal and use it at essentially any time or place.

Portable terminals may be classified into bar-type terminals, flip-type terminals, and folder-type terminals according to their appearance. As the design of the terminal becomes diversified, sliding-type and swing-type terminals have recently appeared on the market.

Telecommunication services using portable terminals were once limited to voice communication and short message transmission in the early stages of the development. However, they have gradually expanded to financial services, geographical information services, and multimedia services.

As the telecommunication service area has expanded, the function of portable terminals has also diversified. For example, it has become commonplace to equip portable terminals with a camera lens assembly. According to the development of camera device technology, recent portable terminals equipped with a camera lens assembly tend to use a high-end camera device comparable to a digital camera.

However, conventional camera lens assemblies are limited to a fixed camera lens contained in the housing of a terminal and to a rotational camera lens rotatably coupled to a hinge unit in the case of a terminal (e.g., a folder-type terminal) having two housings rotatably coupled to each other in consideration of the portability of the portable terminal. Such a limitation is an obstacle to diversifying the terminal design and limits the ability to efficiently utilize space that is available for mounting components of the terminal.

SUMMARY OF THE INVENTION

Accordingly, the present invention has been made to solve the above-mentioned problems occurring in conventional terminals, and an object of the present invention is to provide a portable terminal having a camera lens assembly making it possible to contribute to the diversification of terminal design and to efficiently use the space for mounting components.

In order to accomplish this object, there is provided a portable terminal having a camera lens assembly including a first housing; a second housing adapted to rotate about a hinge axis extending along a direction to unfold from a state in which it faces the first housing or to fold on the first housing; a lens housing positioned on the second housing and adapted to rotate about a rotation axis extending perpendicularly to the hinge axis; and an exposure opening formed on the outer peripheral surface of the lens housing.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted to avoid making the subject matter of the present invention unclear.

Figure 1:
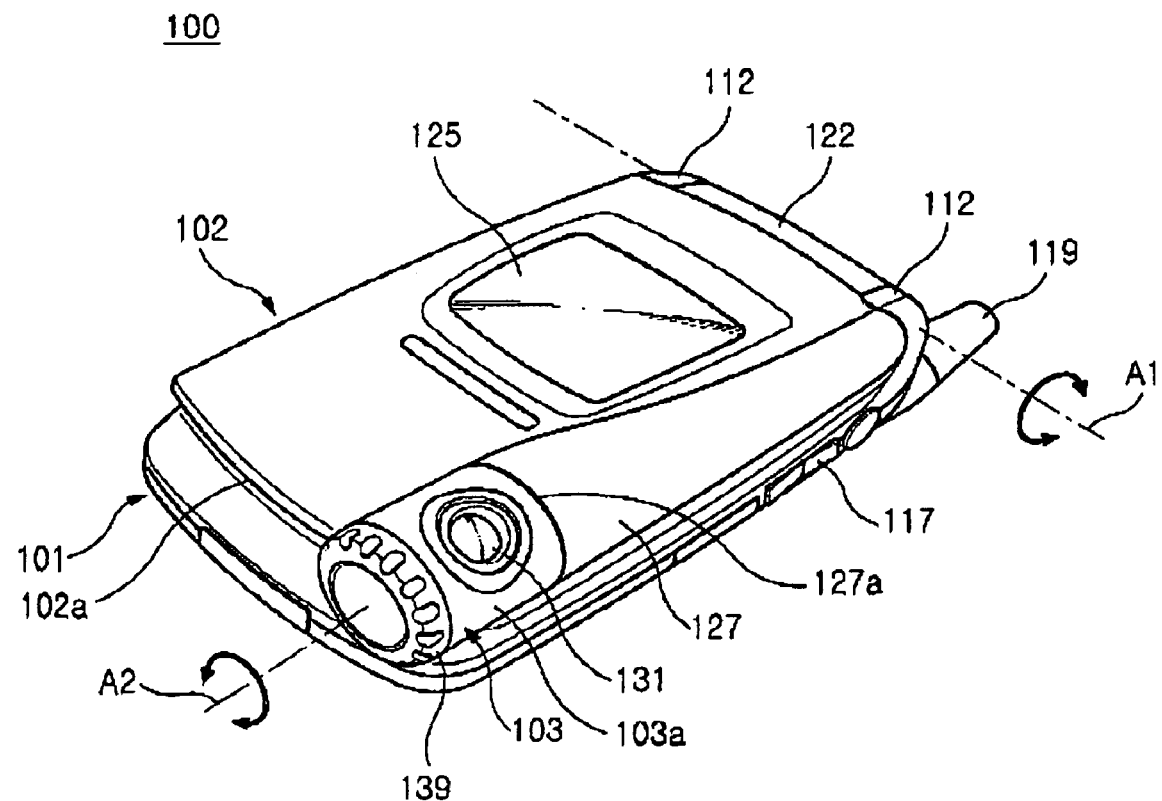
FIG. 1 is a perspective view showing a portable terminal having a camera lens assembly according to a preferred embodiment of the present invention.
Figure 2:
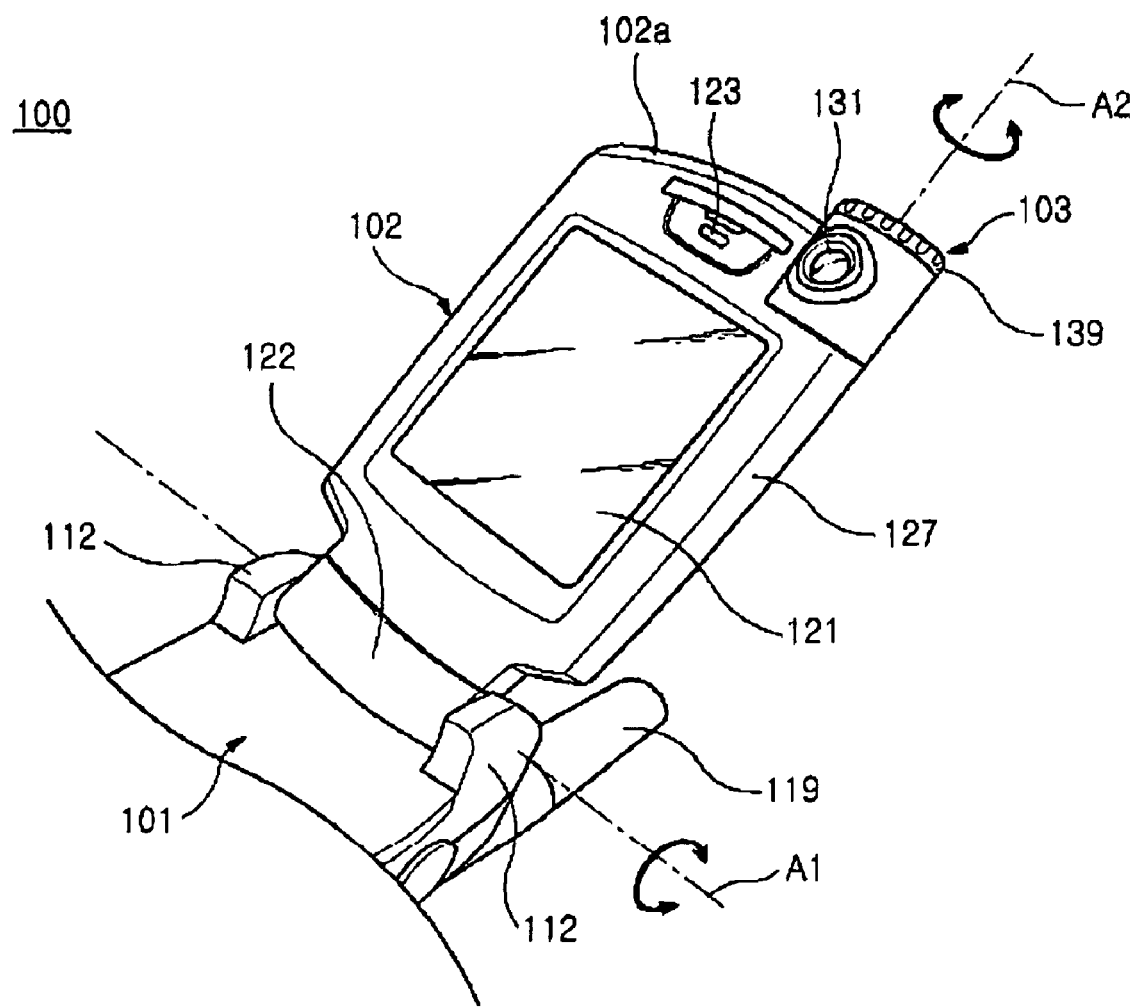
FIG. 2 is a perspective view of the portable terminal shown in FIG. 1 with its second housing unfolded.

FIG. 1 is a perspective view showing a portable terminal 100 having a camera lens assembly according to a preferred embodiment of the present invention and FIG. 2 is a perspective view of the portable terminal 100 shown in FIG. 1 with its second housing 102 unfolded.

As shown in FIGS. 1 and 2, a portable terminal 100 having a camera lens assembly according to a preferred embodiment of the present invention is a folder-type terminal having first and second housings 101 and 102. A lens housing 103 of a camera lens assembly is rotatably coupled to an end of the second housing 102.

The first housing 101 has a keypad made up of a number of keys positioned on a front surface thereof, a transmitter unit (not shown), a pair of side hinge arms 112 positioned on both sides of an upper end thereof while facing each other, and a volume key 117 positioned on a lateral surface thereof to adjust the speech volume. The first housing 101 of the shown terminal 100 has a antenna device 119 extending from the rear surface thereof along a longitudinal direction. If necessary, an embedded antenna may be used instead of the antenna device 119 protruding to the exterior of the terminal.

The second housing 102 has a main display device 121 positioned on an inner surface thereof which faces the first housing 101 and a receiver unit 123 positioned adjacently to a side of the main display device 121. The lens housing 103 is rotatably coupled to an end of the second housing 102.

The lens housing 103 is preferably positioned adjacent to the main display device 121 and parallel to the receiver unit 123. The lens housing 103 has a cylindrical shape and protrudes from the upper surface of the second housing 102. The lens housing 103 has an exposure opening 131 positioned on an outer peripheral surface 103a thereof and a rotation angle adjustment knob 139 positioned on the upper end thereof while protruding from the front end 102a of the second housing 102. The user can easily adjust the rotation angle of the lens housing 103 with the rotation angle adjustment knob 139 protruding from the front end 102a of the second housing 102.

The second housing 102 has a lens coupling unit 127 formed on a side thereof, the diameter of which gradually increases from an end of the second housing 102 to an other end thereof, in order to accommodate the lens housing 103. The lens housing 103 is rotatably coupled to an end 127a of the lens coupling unit 127 in such a manner that the lens housing 103 can rotate about a rotation axis A2 extending along a longitudinal direction of the lens coupling unit 127. As the lens housing 103 is coupled to the end 127a of the lens coupling unit 127, the lens housing 103 is positioned on a corner of a side of the second housing 102.

The second housing 102 has an auxiliary display device 125 positioned on the outer surface thereof to display the receptivity of signals transmitted to and received from base stations, the charging level of the battery, date, time, and the like. The second housing 102 has a center hinge arm 122 formed on the other end thereof to be rotatably coupled between the side hinge arms 112.

As the center hinge arm 122 is rotatably coupled between the side hinge arms 112, a hinge axis A1 is defined about which the second housing 102 rotates to unfold from or fold on the first housing 101.

The rotation axis A2 of the lens housing 103 is perpendicular to the hinge axis A1 and extends through the second housing 102, particularly the lens coupling unit 127. As the lens housing 102 rotates about the rotation axis A2, the exposure opening 131 formed on the lens housing 103 can be directed to various directions for photographing, including toward the interior, exterior, and side of the second housing 102.

The range of rotation of the lens housing 103 is preferably limited to 360° or less. Such limited rotation is useful because a flexible print circuit extends from camera devices within the lens housing 103 to the lens coupling unit 127 in order to connect the camera devices to circuit devices of the terminal, and the limited rotation prevents twisting and damaging by a short circuit if the lens housing 103 is continuously over rotated.

As mentioned above, the portable terminal having a camera lens assembly according to the present invention has a pair of housings adapted to rotate about a hinge axis to fold/unfold and a lens housing adapted to rotate about a rotation axis extending perpendicularly to the hinge axis for photographing in various directions. Furthermore, as the lens housing is not positioned in the terminal, the terminal design can be diversified and the efficiency in space utilization for mounting components improves.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable terminal having a camera lens assembly comprising:
   a first housing;
   a second housing connected to the first housing rotatably about a hinge axis to unfold from a state facing the first housing or to fold on the first housing;
   a lens housing connected to the second housing rotatably about a rotation axis extending perpendicularly to the hinge axis; and
   an exposure opening formed on an outer peripheral surface of the lens housing,
   wherein the second housing has a lens coupling unit formed on a lateral end thereof, a diameter of which gradually increases along the rotation axis from an end of the second housing to an other end, and the lens housing is coupled to an end of the lens coupling unit.

2. The portable terminal having a camera lens assembly as claimed in claim 1, wherein the lens housing has a cylindrical shape and protrudes from an upper surface of the second housing.

3. The portable terminal having a camera lens assembly as claimed in claim 1, further comprising a rotation angle adjustment knob positioned on an upper end of the lens housing.

4. The portable terminal having a camera lens assembly as claimed in claim 3, wherein the rotation angle adjustment knob protrudes from a front end of the second housing.

5. The portable terminal having a camera lens assembly as claimed in claim 1, wherein the lens housing is positioned on a corner of a side of the second housing.

6. The portable terminal having a camera lens assembly as claimed in claim 1, further comprising a display device positioned on an inner surface of the second housing which faces the first housing, wherein the lens housing is adapted to rotate about the rotation axis so that photographing can be performed in a same direction in which a user views a screen of the display device.

7. The portable terminal having a camera lens assembly as claimed in claim 1, wherein the rotation axis extends through the second housing in a longitudinal direction.

8. The portable terminal having a camera lens assembly as claimed in claim 1, wherein a range of rotation of the lens housing is less than 360°.

* * * * *